(No Model.)

T. GUILLEAUME.
ELECTRIC CABLE.

No. 502,358.  Patented Aug. 1, 1893.

Witnesses:
Rich. Schulder
Hugo Haines.

Inventor:
Theodor Guilleaume

UNITED STATES PATENT OFFICE.

THEODORE GUILLEAUME, OF COLOGNE, GERMANY.

ELECTRIC CABLE.

SPECIFICATION forming part of Letters Patent No. 502,358, dated August 1, 1893.

Application filed March 1, 1893. Serial No. 464,285. (No model.)

*To all whom it may concern:*

Be it known that I, THEODORE GUILLEAUME, a subject of the German Emperor, residing at Cologne, in the German Empire, have invented new and useful Improvements in Electric Cables, (in respect of which I have applied for Letters Patent in Germany, dated June 30, 1892, No. F 6126, and have caused an application for Letters Patent to be lodged in Great Britain, dated June 20, 1892, No. 11,526, neither of which patents has as yet been obtained,) of which the following is a specification.

This invention relates to electric cables the conductors of which are partially inclosed within and insulated by air-spaces, with the object of reducing the "capacity." In such cables, it is of importance that the air-spaces should be protected throughout against humidity or moisture, and that any sheathing with which the cable may be provided for protection against physical injury should not, by pressing on the core, deform the air-spaces.

The accompanying drawings represent a cable constructed according to my improved method.

Figure 1:
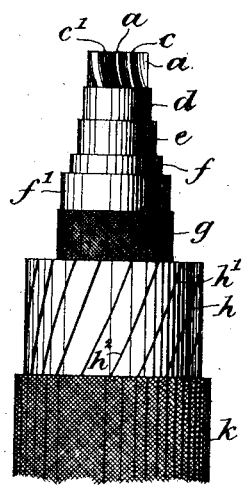
Figure 2:
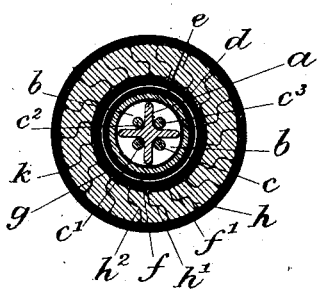

Figure 1 is an elevation showing the several constituent parts, and Fig. 2 is a transverse section.

In carrying out this invention, the cable is preferably constructed as follows:

$a$ is a twisted strip of non-conducting material formed in such a manner as to present channels or air-spaces $b$.

$c\ c'\ c^2\ c^3$ are conducting wires, each insulated from the others by the non-conducting material $a$, and about which is wrapped a covering $d$ of paper or other non-conducting material.

$e$ is a lead sheathing which supports gutta-percha coverings $f f'$.

$g$ is a serving of soft material, such as hemp yarn, about which is applied a metal sheathing consisting of wires $h\ h'\ h^2$, &c., formed and arranged in such a manner as to interlock with one another and to afford to the parts inclosed by the sheathing protection from external pressure.

$k$ is an external serving of tarred hemp or the like for the protection of the metallic sheathing last referred to. By these means, the air-spaces in which the conductors lie are preserved from being crushed or distorted as the result of rough usage. Although in the present illustration four conducting wires are shown, it will be obvious that six or other number desired may be employed, the strip of non-conducting material $a$ being formed with a corresponding number of air-channels $b$.

In cases where the cable contains more than one core or group of conductors, each may be provided with the sheathings of lead and gutta-percha before they are twisted together to form a strand. Or, the several cores or groups may be first twisted together, and the sheathings of lead and gutta-percha afterward applied. In either case, the serving of textile material and the sheathing of interlocked wires are applied to the strand or cable as a whole.

I am aware that lead sheathings have been employed in the manufacture of cables wherein the conductors are arranged in air-spaces; but in those constructions the lead sheathing is employed for the purpose of protecting the cable from moisture, while according to my invention the function of the lead sheathing is to support a waterproofing material, such as gutta-percha, which is applied in a plastic state and which except for the presence of the lead sheathing would fill the said air-spaces.

What I claim as my invention, and desire to secure by Letters Patent, is—

1. An electric cable consisting of a series of naked conductors $c\ c'\ c^2$ &c., respectively occupying air-spaces $b\ b'\ b^2$ &c. in a spirally grooved strip of non-conducting material $a$, a lead sheathing $e$, gutta-percha or like waterproof coating $f$ and a metallic sheathing composed of interlocked wires such as $h\ h'\ h^2$ &c., substantially as herein described.

2. In an electric cable, the combination, with a series of naked conductors $c\ c'\ c^2$ &c. respectively occupying air-spaces $b\ b'\ b^2$ &c. in a spirally grooved strip of non-conducting material $a$, of a lead sheathing $e$ and a gutta-percha or like water proof coating $f$, the lead sheathing surrounding the core of conductors and insulating material and serving to support the waterproof coating, substantially as herein set forth.

3. In an electric cable, the combination, with a series of naked conductors $c\ c'\ c^2$ &c. respectively occupying air-spaces $b\ b'\ b^2$ &c. in a spirally grooved strip of non-conducting material $a$, of a metallic sheathing composed of interlocked wires such as $h\ h'\ h^2$ &c. insulated from the aforesaid central group of parts, and serving to protect the same from distortion, substantially as herein set forth.

THEODORE GUILLEAUME.

Witnesses:
RICH. SCHULDER,
HUGO HAINES.